United States Patent
Tomioka et al.

(10) Patent No.: US 6,716,510 B2
(45) Date of Patent: Apr. 6, 2004

(54) POLYCARBONATE RESIN FOR OPTICAL DISK SUBSTRATE AND OPTICAL DISK SUBSTRATE

(75) Inventors: Tatsuya Tomioka, Ichihara (JP); Hiroshi Kawato, Ichihara (JP); Munehiro Chosa, Tokyo (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/926,828

(22) PCT Filed: Apr. 26, 2001

(86) PCT No.: PCT/JP01/03647
§ 371 (c)(1), (2), (4) Date: Dec. 27, 2001

(87) PCT Pub. No.: WO01/83614
PCT Pub. Date: Nov. 8, 2001

(65) Prior Publication Data
US 2002/0137827 A1 Sep. 26, 2002

(30) Foreign Application Priority Data

| Apr. 27, 2000 | (JP) | 2000-127336 |
| May 29, 2000 | (JP) | 2000-157802 |
| Aug. 2, 2000 | (JP) | 2000-234047 |
| Aug. 2, 2000 | (JP) | 2000-234048 |

(51) Int. Cl.$^7$ .......... C08L 69/00; C08K 5/103; C08G 64/06
(52) U.S. Cl. ........ 428/64.7; 524/147; 524/310; 524/313; 524/317; 528/196
(58) Field of Search ............. 524/310, 313, 524/317; 528/196

(56) References Cited

U.S. PATENT DOCUMENTS

| 5,215,799 A | * | 6/1993 | Sakoda |
| 5,785,823 A | * | 7/1998 | Meurer |
| 6,022,943 A | | 2/2000 | Inoue et al. |

FOREIGN PATENT DOCUMENTS

| EP | 0 592 900 | | 4/1994 |
| EP | 0 615 996 | | 9/1994 |
| EP | 0 947 538 | | 10/1999 |
| JP | 6-48970 | | 2/1994 |
| JP | 7-25798 | | 1/1995 |
| JP | 8-73724 | | 3/1996 |
| JP | 2000-001608 | * | 1/2000 |
| JP | 2000-63505 | | 2/2000 |
| JP | 2000-229899 | * | 8/2000 |

OTHER PUBLICATIONS

Machine Translation of J08073724.*

* cited by examiner

Primary Examiner—David J. Buttner
(74) Attorney, Agent, or Firm—Oblon, Spivak, McClelland, Maier & Neustadt, P.C.

(57) ABSTRACT

The present invention relates to a polycarbonate resin that has a viscosity average molecular weight of from 10,000 to 17,000 and has characteristic features in an iron content, a free total phenol content, a content of a releasing agent, a fraction of hydroxyl end groups, a $^1$H-NMR spectrum or the like. The polycarbonate resin has less defects due to flash without increase of an addition amount of a releasing agent to an unnecessary level and therefore is suitable for a material of an optical disk substrate.

18 Claims, 7 Drawing Sheets

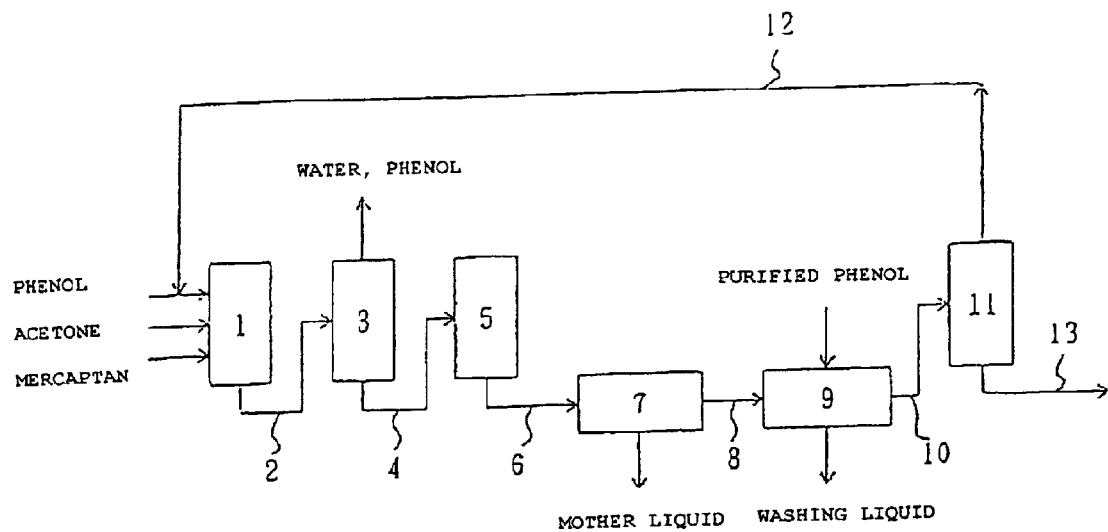
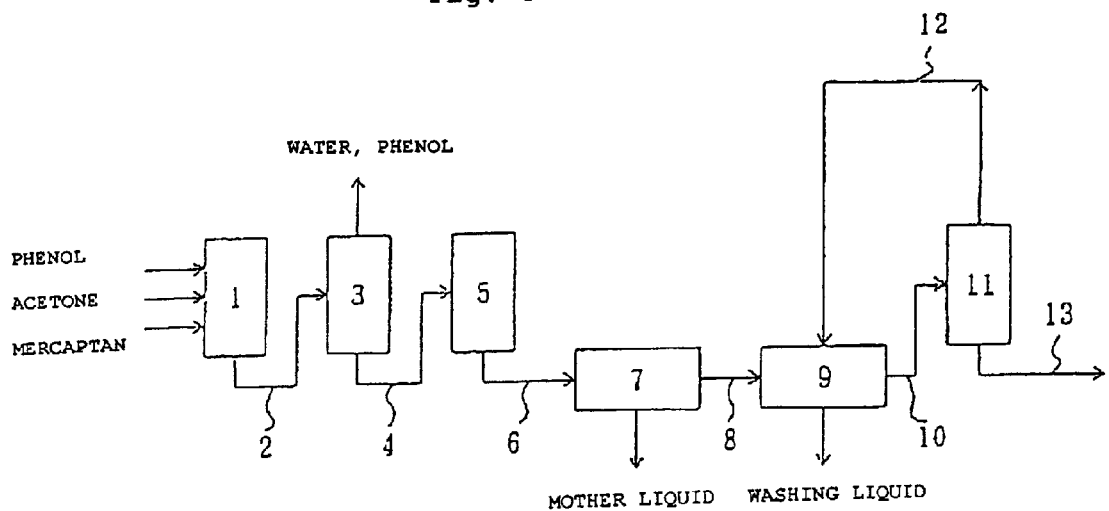

POLYCARBONATE RESIN FOR OPTICAL DISK SUBSTRATE AND OPTICAL DISK SUBSTRATE

TECHNICAL FIELD

The present invention relates to a polycarbonate resin for an optical disk substrate and an optical disk substrate, and more particularly, it relates to a polycarbonate resin that is suitable for a material of an optical disk substrate having less defects due to flash, and an optical disk substrate formed with the resin.

BACKGROUND ART

A polycarbonate resin is widely used as a substrate of an optical disk, such as CD, CD-ROM, MO, CD-R, CD-RW, DVD-ROM, DVD-R and DVD-RAM, owing to the transparency, the heat resistance and the low water absorbing property thereof. In general, these optical disks are often produced by such a process that a surface formed by engraving signals, such as pits and grooves, on a thin plate of nickel called as a stamper arranged in a metallic mold is transferred to a substrate formed with a polycarbonate resin through injection molding.

In the production of a substrate of an optical disk in recent years, several tens to a number exceeding one hundred of molding machines are introduced in one factory to further enhance the mass production volume efficiency, and simultaneously quality control is severely ensured. However, although there is no change of a stamper or no change in molding conditions, and the factors determining the flowability of a polycarbonate resin, such as the molecular weight, the molecular weight distribution, the glass transition temperature and the like, are stable within prescribed ranges, there are some cases where releasing failure extemporaneously occurs upon sprue cutting of a center hole of a disk substrate, and the outer circumference of the disk substrate or fine flash formed on the outer circumference is in friction with a metallic mold due to the releasing failure to cause contamination of resin dusts, whereby the yield of the disk substrates is decreased to several percents to several tens percents. The phenomenon is generally referred to as a defect due to flash, which can be prevented by increasing an amount of a releasing agent. However, the amount of the releasing agent cannot be increased to an unnecessary level because there is a tendency of occurrence of defects on optical characteristics, particularly such a tendency that occurrence of defects of polarization and white turbidity in the polycarbonate resin is accelerated upon an accelerated aging test under constant temperature and humidity, whereby the reliability of storage stability of recorded data as an optical disk is also lowered.

The invention has been developed under the circumstances, and is to provide a polycarbonate resin that is suitable for a material of an optical disk substrate having less defects due to flash without increase of an addition amount of a releasing agent to an unnecessary level, and an optical disk substrate formed with the resin.

DISCLOSURE OF THE INVENTION

As a result of various investigations made by the inventors, it has been found that occurrence of defects due to flash is correlated with (1) an amount of iron and a free total phenol content in a polycarbonate resin, (2) the particular impurities in 2,2-(4-hydroxyphenyl)propane as a raw material and a fraction of hydroxyl end groups in the polycarbonate resin, (3) an iron amount and a $^1$H-NMR spectrum of the polycarbonate resin, and (4) an iron amount and a fraction of hydroxyl end groups in the polycarbonate resin, and thus the first invention to the fourth invention have been completed.

That is, the first invention will be outlined below.

1. A polycarbonate resin for an optical disk substrate characterized by having a viscosity average molecular weight of from 10,000 to 17,000, an iron content of 0.2 ppm or less and a free total phenol content of 80 ppm or less, and containing from 100 to 500 ppm of a releasing agent.

2. A polycarbonate resin for an optical disk substrate described in the item 1, which has an acetone soluble content of 12% by mass or less.

3. A polycarbonate resin for an optical disk substrate described in the item 1 or 2, which contains from 150 to 350 ppm of a releasing agent.

4. A polycarbonate resin for an optical disk substrate described in one of the items 1 to 3, wherein the releasing agent is a polyhydric alcohol fatty acid ester.

5. An optical disk substrate comprising a polycarbonate resin for an optical disk substrate described in one of the items 1 to 4.

The second invention will be outlined below.

1. A polycarbonate resin for an optical disk substrate characterized by being produced with, as a raw material, 2,2-(4-hydroxyphenyl)propane (hereinafter referred to as bisphenol A) having a content of 2-(2-hydroxylphenyl)-2-(4-hydroxylphenyl)propane (hereinafter referred to as 2,4-bisphenol A) of 1,000 ppm or less, a content of a cyclic dymer of p-isopropenylphenol represented by the following general formula (I) (hereinafter referred to as a cyclic IPP dimer) of 150 ppm or less:

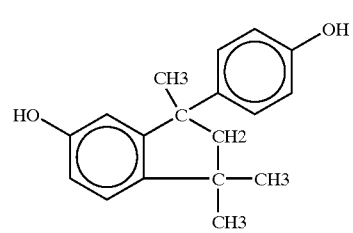

and a content of a trisphenol compound represented by the following general formula (II) (hereinafter simply referred to as a trisphenol) of 150 ppm or less:

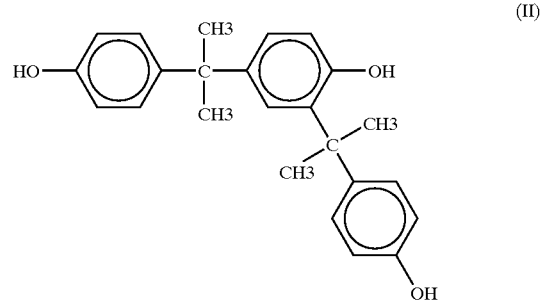

having a viscosity average molecular weight of from 10,000 to 17,000 and a fraction of hydroxyl end groups of less than 7% by mole, and containing from 100 to 500 ppm of a releasing agent.

2. A polycarbonate resin for an optical disk substrate as described in the item 1, which has a free total phenol content of 80 ppm or less.

3. A polycarbonate resin for an optical disk substrate described in the item 1 or 2, which contains from 150 to 350 ppm of a releasing agent.

4. A polycarbonate resin for an optical disk substrate described in one of the items 1 to 3, wherein the releasing agent is a polyhydric alcohol fatty acid ester.

5. An optical disk substrate comprising a polycarbonate resin for an optical disk substrate described in one of the items 1 to 4.

The third invention will be outlined below.

1. A polycarbonate resin for an optical disk substrate characterized by satisfying the following conditions:
(1) a viscosity average molecular weight is from 10,000 to 17,000,
(2) an iron content is 0.2 ppm or less;
(3) when an intensity of a chemical shift δ of from 7.0 to 7.5 ppm based on a phenyl ring in a spectrum measured with $^1$H-NMR is 1,000, signal intensities at δ of from 1.02 to 1.08 and from 6.69 to 6.73 are 0.01 or less; and
(4) from 100 to 500 ppm of a releasing agent is contained.

2. A polycarbonate resin for an optical disk substrate as described in the item 1, which contains from 150 to 350 ppm of a releasing agent.

3. A polycarbonate resin for an optical disk substrate described in the item 1 or 2, wherein the releasing agent is a polyhydric alcohol fatty acid ester.

4. A polycarbonate resin for an optical disk substrate described in the item 3, wherein the polyhydric alcohol fatty acid ester is a fatty acid monoester of glycerin.

5. An optical disk substrate comprising a polycarbonate resin for an optical disk substrate described in one of the items 1 to 4.

The fourth invention will be outlined below.

1. A polycarbonate resin for an optical disk substrate characterized by having a viscosity average molecular weight of from 10,000 to 17,000, an iron content of 0.2 ppm or less and a fraction of hydroxyl end groups of less than 7% by mole, and containing from 100 to 500 ppm of a releasing agent.

2. A polycarbonate resin for an optical disk substrate as described in the item 1, which contains from 150 to 350 ppm of a releasing agent.

3. A polycarbonate resin for an optical disk substrate described in the item 1 or 2, wherein the releasing agent is a polyhydric alcohol fatty acid ester.

4. A polycarbonate resin for an optical disk substrate described in the item 3, wherein the polyhydric alcohol fatty acid ester is a fatty acid monoester of glycerin.

5. An optical disk substrate comprising a polycarbonate resin for an optical disk substrate described in one of the items 1 to 4.

BRIEF DESCRIPTION OF THE DRAWINGS

In FIGS. 1 to 6, symbol 1 denotes spectra in Example III-1, Comparative Example III-2 and Comparative Example III-3, and symbol 2 denotes a spectrum in Comparative Example III-1.

FIG. 7 shows a diagram of a production scheme of bisphenol A in Example IV-1, Comparative Example IV-2 and Comparative Example IV-3.

FIG. 8 shows a diagram of a production scheme of bisphenol A in Comparative Example IV-1.

In FIGS. 7 and 8, symbol 1 denotes a reactor, symbol 3 denotes a condensation step, symbol 5 denotes a crystallizing step, symbol 7 denotes a separating step, symbol 9 denotes a washing step, symbol 11 denotes an adduct decomposition step, symbol 12 denotes distilled phenol, and symbol 13 denotes bisphenol A.

BEST MODE FOR CARYYING OUT THE INVENTION

Figure 1:
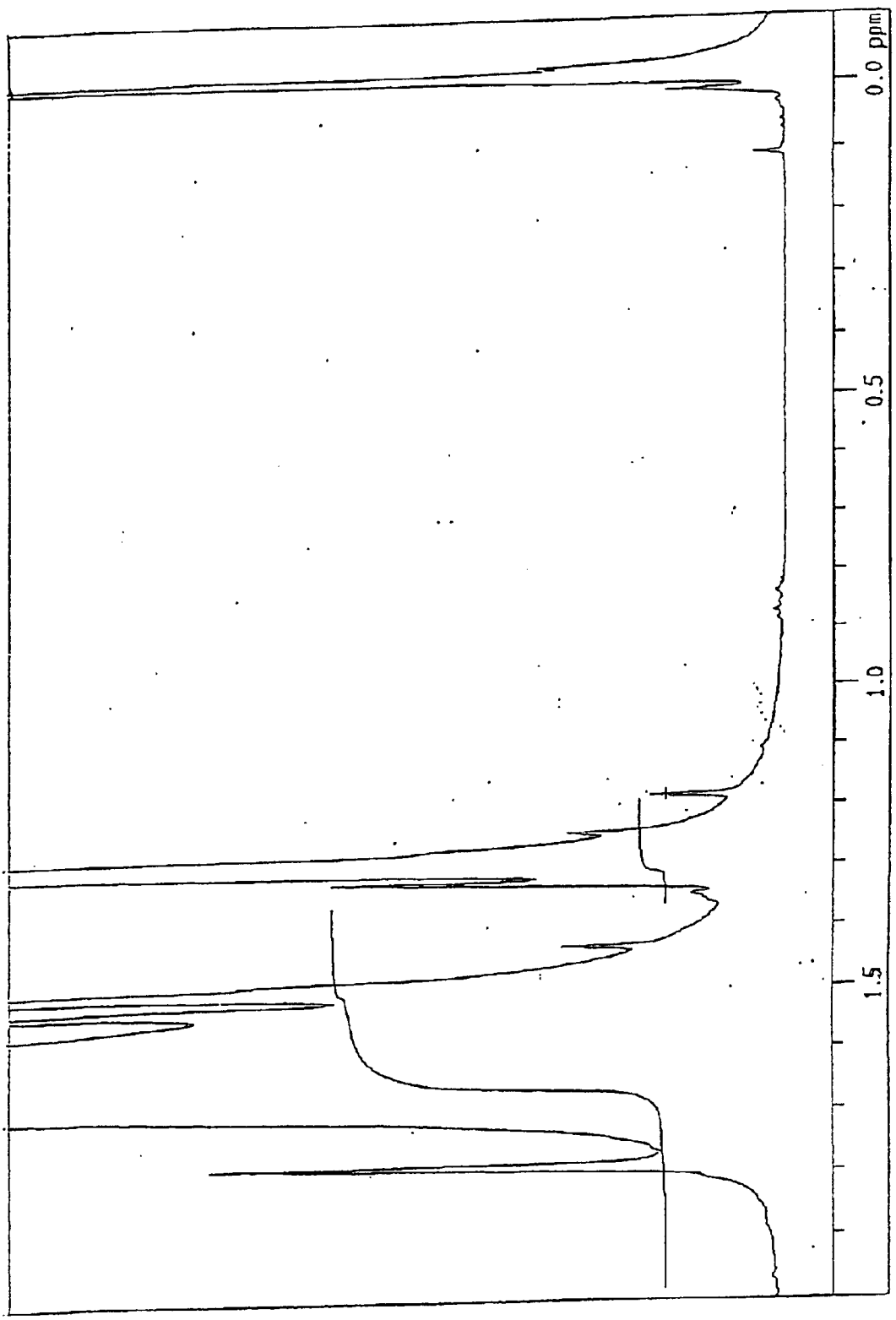
FIG. 1 shows a $^1$H-NMR spectrum chart (0 to 2 ppm) in Example III-1, Comparative Example III-2 and Comparative Example III-3.

An embodiment of the invention (the first invention to the fourth invention) will be described below.

I. First Invention

A polycarbonate resin used in an optical disk substrate of the first invention (sometimes simply referred to as an "invention" in this chapter) will be described.

The chemical structure and the production process of the polycarbonate resin are not particularly limited, and various kinds thereof can be used. For example, an aromatic polycarbonate resin produced through a reaction between a dihydric phenol and a carbonate precursor is preferably used. The production process that can be used may be either the solution process or the molten process.

The dihydric phenol includes various kinds thereof, and preferred examples thereof include 2,2-bis(4-hydroxyphenyl)propane, bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cyclohexane, bis(4-hydroxyphenyl)ether, bis(4-hydroxyphenyl)sulfide, bis(4-hydroxyphenyl)sulfone, bis(4-hydroxyphenyl)sulfoxide, bis(4-hydroxyphenyl)ketone, hydroquinone, resorcin, catechol and the like. Among these dihydric phenols, a bis(hydroxyphenyl)alkane, particularly 2,2-bis(4-hydroxyphenyl)propane (bisphenol A), is preferred. These dihydric phenols may be used solely or in combination of two or more of them through mixing.

As the carbonate precursor, a carbonyl halide, a carbonyl ester and a haloformate can be used. More specific examples thereof include phosgene, dihaloformate of a dihydric phenol, diphenyl carbonate, dimethyl carbonate, diethyl carbonate and the like.

With respect to the chemical structure of the polycarbonate resin, those having a molecular chain having a linear structure, a cyclic structure or a branched structure can be used. Among these, as the polycarbonate resin having a branched structure, those produced by using, as a branching agent, 1,1,1,-tris(4-hydroxyphenyl)ethane, α,α',α"-tris(4-hydroxyphenyl)-1,3,5-triisopropylbenzene, fluoroglycine, trimellitic acid, isatin bis(o-crezol) and the like are preferably used. A polyester polycarbonate resin produced by using a bifunctional carboxylic acid, such as terephthalic acid and the like, or an ester forming derivative thereof can be used as the polycarbonate resin. Furthermore, a mixture of these polycarbonate resins having various chemical structures can be used.

The viscosity average molecular weight of the polycarbonate resin is generally from 10,000 to 30,000. The viscosity average molecular weight (Mv) is a value obtained in such a manner that a viscosity of an methylene chloride solution at 20° C. is measured by using an Ubbelohde viscometer to obtain a limiting viscosity [η], and the value is calculated by the equation $[\eta]=1.23\times10^{-5} Mv^{0.83}$. For the adjustment of the molecular weight of the polycarbonate resin, phenol, p-tert-butylphenol, p-tert-octylphenol, p-cumylphenol and the like are used.

As for the polycarbonate resin, the solution process is generally employed, and thus it will be described under assumption where it is obtained by the solution process.

It is necessary that flakes of a polycarbonate resin produced by the foregoing process are subjected to an elution treatment by using a solvent, such as acetone, dioxane and the like, so as to elute impurities and free total phenol. In this case, it is sufficient that the elution treatment is carried out in the state of pellets, so as to provide a viscosity average molecular weight of from 10,000 to 17,000, an iron content of 0.2 ppm or less and a free total phenol content of 80 ppm or less. It is preferred that the acetone soluble content is 12% by mass or less. A releasing agent and, depending on necessity, from 20 to 100 ppm of a phosphorous antioxidant are added to the dried polycarbonate resin flakes after the elution treatment, and it is then pelletized by an extruder. It is necessary that the releasing agent in the pellets is from 100 to 500 ppm (preferably from 150 to 350 ppm).

When the releasing agent is less than 100 ppm, occurrence of defects due to flash caused by releasing failure is increased, whereas when it exceeds 500 ppm, defects of polarization and white turbidity as an optical disk are liable to be occur, and thus both cases are not preferred.

As the releasing agent, a polyhydric alcohol fatty acid ester is preferably used, and examples thereof include a partial ester of a trihydric alcohol, such as glycerin, trimethylpropane, hexanetriol and the like, and a tetrahydric or more valence of alcohol, such as pentaerythritol, mesoerythritol, xylitol, sorbitol and the like, with a fatty acid having a carbon number of from 10 to 30. Examples of the fatty acid include capric acid, undecanoic acid, lauric acid, tridecanoic acid, myristic acid, pentadecanoic acid, palmitic acid, margaric acid, stearic acid, nonadecanoic acid, eicosanoic acid, behenic acid and the like. Specifically, a glycerin monoester, such as glycerin monostearate, glycerin monopalmitate, glycerin monomyristate, glycerin mono laurate and the like, pentaerythritol distearate, pentaerythritol tristearate, pentaerythritol monopalmitate, pentaerythritol dipalmitate, mesoerythritol trilaurate, xylitol trilaurate, xylitol distearate, xylitol tristearate, xylitol tetrastearate and the like are used. These esters may be used singly or in combination of two or more of them.

Examples of the phosphorous antioxidant include a trialkyl phosphite, such as trimethyl phosphite, triethyl phosphite, tributyl phosphite, trioctyl phosphite, trinonyl phosphite, tridecyl phosphite, trioctadecyl phosphite, distearylpentaerythtyl diphosphite, tris(2-chloroethyl) phosphite, tris(2,3-dichloropropyl)phosphite and the like; a tricycloalkyl phosphite, such as tricyclohexyl phosphite and the like; a triaryl phosphite, such as triphenyl phosphite, tricresyl phosphite, tris(ethylphenyl)phosphite, tris(butylphenyl)phosphite, tris(nonylphenyl)phosphite, tris(hydroxyphenyl)phosphite and the like; a monoalkyldiaryl phosphite, such as 2-ethylhexyldiphenyl phosphite; a trialkyl phosphate, such as trimethyl phosphate, triethyl phosphate, tributyl phosphate, trioctyl phosphate, tridecyl phosphate, trioctadecyl phosphate, distearylpentherythtyl diphosphate, tris(2-chloroethyl)phosphate, tris(2,3-dichloropropyl)phosphate and the like; a tricycloalkyl phosphate, such as tricyclohexyl phosphate and the like; a triaryl phosphate, such as triphenyl phosphate, tricresyl phosphate, tris(nonylphenyl)phosphate, 2-ethylphenyl diphenyl phosphate and the like; and the like.

These may be used solely or in combination of two or more kinds of them.

As described in the foregoing, it is necessary that the polycarbonate resin has, in the state of pellets, a viscosity average molecular weight of from 10,000 to 17,000, an iron content of 0.2 ppm or less, and a free total phenol content of 80 ppm or less. When the residual iron content and the free total phenol content are too large, defects due to flash frequently occur. It is preferred that the acetone soluble content is 12% by mass or less from the standpoint of prevention of occurrence of defects due to flash.

When the viscosity average molecular weight is less than 10,000, the mechanical strength of the molded article is lowered, whereas when it exceeds 17,000, distortion remains in the molded article due to shortage of flowability upon molding, so as to lower the optical characteristics, and therefore both the cases are not preferred. The measurement methods of the iron content, the free total phenol content and the acetone soluble content are as follows.

(1) Iron Content

After ashing a sample, it is quantitatively analyzed by the graphite furnace atomic absorption spectrometry.

(2) Free Total Phenol Content

It is the total amount of the phenols, such as the dihydric phenol of the raw material monomer, the monohydric phenol of the terminating agent and the like, and is analyzed by the following method.

(1) 10 g of a sample is put in cylindrical filter paper.

(2) 120 cc of acetone and 2 or 3 pieces of glass zeolite are put in a flat-bottom flask.

(3) Soxhlet extraction is carried out. The extraction time in the case of pellets is 4 hours from the point where the first acetone reflux is completed.

(4) The acetone solution is set in a rotary evaporator, and acetone is distilled off and concentrated to dry.

(5) After drying at 105° C. for one hour in a dryer, it is stood to cool to room temperature.

(6) The content is dissolved by adding 10 cc of methylene chloride.

(7) 50 cc of a 0.1 N sodium hydroxide aqueous solution is added and stirred with a stirrer for 15 minutes.

(8) The content is stood to be separated, and about 25 cc of the sodium hydroxide solution as the aqueous layer (upper layer) is collected and filtered with 5A filter paper.

(9) The total phenol content of the filtrate is measured by a spectrophotometer.

(3) Acetone Soluble Content (1) 1 g of a sample is dissolved in 10 cc of methylene chloride.

(2) 200 cc of acetone is added thereto to precipitate polycarbonate.

(3) The polycarbonate is removed by filtration.

(4) After concentrating the filtrate to dry, the weight is measured and is then designated as the acetone soluble content.

The optical disk substrate of the invention can be obtained by molding the polycarbonate pellets in an arbitrary method, such as the injection molding method, a compacting molding method, the extrusion molding method and the like. Among these, the injection molding method using a stamper is preferred.

The invention will be then described more specifically with reference to examples and comparative examples.

EXAMPLE I-1

To 100 kg of polycarbonate in a flake form having an acetone soluble content of 14% by mass and a free total phenol content of 120 ppm produced by the solution process by using bisphenol A and phosgene as raw materials, 225 kg of acetone was added and stirred at 50° C. for one hour to carry out an elution treatment. Thereafter, acetone was removed, and it was dried at 120° C. under reduced pressure of from 1.3 to 40 hPa for 20 hours. The resulting polycarbonate a flake form had a viscosity average molecular weight of 14,900, to which 300 ppm of glycerin monostearate as a releasing agent and 40 ppm of tris(2,4-di-t-butylphenyl)phosphite as a phosphorous antioxidant were added, and then extruded to be pelletized. The pellets had an acetone soluble content of 8% by mass, a free total phenol content of 70 ppm and an iron content of 0.1 ppm, and contained 280 ppm of glycerin monostearate. The pellets were fed to an injection molding machine (DISK5, produced by Sumitomo Heavy Industries, Ltd.), and 600 pieces of disk substrates having a diameter of 130 mm and a thickness of 1.2 mm under the following conditions.
Cylinder temperature: 325° C.
Metallic mold temperature: 90° C. (stamper side)/85° C.
Stamper: for CD-ROM The resulting disk substrates were examined with a flaw defect inspection machine, and as a result, the defects due to flash were 4.5%. The disk substrates were subjected to accelerated deterioration under constant temperature and humidity of 90° C. and 90% for 300 hours, and the block error rate was 5 when they were measured with an electric characteristics inspection machine.

EXAMPLE I-2

To 100 kg of polycarbonate in a flake form having an acetone soluble content of 12% by mass and a free total phenol content of 120 ppm produced by the solution process by using bisphenol A and phosgene as raw materials, 225 kg of acetone was added and stirred at 60° C. for one hour to carry out an elution treatment. Thereafter, acetone was removed, and it was dried at 120° C. under reduced pressure of from 1.3 to 40 hPa for 20 hours. The resulting polycarbonate a flake form had a viscosity average molecular weight of 14,900, to which 300 ppm of glycerin monostearate as a releasing agent and 40 ppm of tris(2,4-di-t-butylphenyl)phosphite as a phosphorous antioxidant were added, and then pelletized with an extruder. The pellets had an acetone soluble content of 6% by mass, a free total phenol content of 40 ppm and an iron content of 0.1 ppm, and contained 280 ppm of glycerin monostearate. The pellets were formed into 600 pieces of disk substrates in the same manner as in Example I-1. The resulting disk substrates were examined with a flaw defect inspection machine, and as a result, the defects due to flash were 2.5%.

Comparative Example I-1

To polycarbonate in a flake form having an acetone soluble content of 14% by mass, a free total phenol content of 120 ppm and a viscosity average molecular weight of 14,900 produced by the solution process by using bisphenol A and phosgene as raw materials, 300 ppm of glycerin monostearate as a releasing agent and 40 ppm of tris(2,4-di-t-butylphenyl)phosphite as a phosphorous antioxidant were added, and then pelletized with an extruder. The pellets had an acetone soluble content of 13% by mass, a free total phenol content of 90 ppm and an iron content of 0.1 ppm, and contained 280 ppm of glycerin monostearate. The pellets were formed into 600 pieces of disk substrates in the same manner as in Example I-1. The resulting disk substrates were examined with a flaw defect inspection machine, and as a result, the defects due to flash were 15%.

Comparative Example 1-2

To 100 kg of polycarbonate in a flake form having an acetone soluble content of 14% by mass and a free total phenol content of 120 ppm produced by the solution process by using bisphenol A and phosgene as raw materials, 225 kg of acetone was added and stirred at 50° C. for one hour to carry out an elution treatment. Thereafter, acetone was removed, and it was dried at 120° C. under reduced pressure of from 1.3 to 40 hPa for 20 hours. The resulting polycarbonate a flake form had a viscosity average molecular weight of 14,900, to which 50 ppm of glycerin monostearate as a releasing agent and 40 ppm of tris(2,4-di-t-butylphenyl)phosphite as a phosphorous antioxidant were added, and then pelletized with an extruder. The pellets had an acetone soluble content of 8% by mass, a free total phenol content of 80 ppm and an iron content of 0.1 ppm, and contained 40 ppm of glycerin monostearate. The pellets were formed into 600 pieces of disk substrates in the same manner as in Example I-1. The resulting disk substrates were examined with a flaw defect inspection machine, and as a result, the defects due to flash were 11.0%.

Comparative Example I-3

To 100 kg of polycarbonate in a flake form having an acetone soluble content of 14% by mass and a free total phenol content of 120 ppm produced by the solution process by using bisphenol A and phosgene as raw materials, 225 kg of acetone was added and stirred at 50° C. for one hour to carry out an elution treatment. Thereafter, acetone was removed, and it was dried at 120° C. under reduced pressure of from 1.3 to 40 hPa for 20 hours. The resulting polycarbonate a flake form had a viscosity average molecular weight of 14,900, to which 600 ppm of glycerin monostearate as a releasing agent and 40 ppm of tris(2,4-di-t-butylphenyl)phosphite as a phosphorous antioxidant were added, and then pelletized with an extruder. The pellets had an acetone soluble content of 8% by mass, a free total phenol content of 80 ppm and an iron content of 0.1 ppm, and contained 550 ppm of glycerin monostearate. The pellets were formed into 600 pieces of disk substrates in the same manner as in Example I-1. The resulting disk substrates were examined with a flaw defect inspection machine, and as a result, the defects due to flash were 4.0%, but after the disk substrates were subjected to accelerated deterioration under constant temperature and humidity of 90° C. and 90% for 300 hours, the block error rate was 25 when they were measured with an electric characteristics inspection machine.

II. Second Invention

The second invention (sometimes simply referred to as an "invention" in this chapter) will be described in detail.

In the invention, it is necessary that the amount of 2,4-bisphenol A is 1,000 ppm or less, the amount of an IPP dimer is 150 ppm or less, and the amount of trisphenol is 150 ppm or less in bisphenol A as a raw material of the polycarbonate resin. When the amounts each is too large, defects due to flash frequently occur upon molding the polycarbonate as a disk.

Bisphenol A herein is produced in an ordinary manner from phenol and acetone, but it is necessarily purified upon a certain step of the process. While various kinds of purification methods can be employed, it is preferred that purification is carried out in the step of an adduct of bisphenol A and phenol, as described in JP-A-7-25798. That is, in a production process of bisphenol A, in which an adduct of bisphenol A and phenol is crystallized from a phenol solution of bisphenol A obtained through a reaction of phenol and acetone in the presence of an acid catalyst, and after solid-liquid separation of the resulting slurry, phenol is removed from the solid component, it is sufficient that before removing phenol after the solid-liquid separation of the slurry, such an operation is repeated at least once that the adduct of bisphenol A and phenol is dissolved in phenol and then crystallized, followed by solid-liquid separation of the slurry.

The polycarbonate resin used in the optical disk substrate of the invention will be described.

As the polycarbonate resin, an aromatic polycarbonate resin produced through a reaction of bisphenol A as a dihydric phenol and a carbonate precursor is preferably used. The production process may be either the solution process or the molten process.

In this case, as the carbonate precursor, a carbonyl halide, a carbonyl ester and a haloformate can be used. More specific examples thereof include phosgene, dihaloformate of a dihydric phenol, diphenyl carbonate, dimethyl carbonate, diethyl carbonate and the like.

With respect to the chemical structure of the polycarbonate resin, those having a molecular chain having a linear structure, a cyclic structure or a branched structure can be used. Among these, as the polycarbonate resin having a branched structure, those produced by using, as a branching agent, 1,1,1-tris(4-hydroxyphenyl)ethane, $\alpha,\alpha',\alpha''$-tris(4-hydroxyphenyl)-1,3,5-triisopropylbenzene, fluoroglycine, trimellitic acid, isatin bis(o-crezol) and the like are preferably used.

The viscosity average molecular weight of the polycarbonate resin is generally from 10,000 to 30,000, but it is necessarily from 10,000 to 17,000 for the polycarbonate resin of the invention. The viscosity average molecular weight (Mv) is a value obtained in the same manner as in the first invention. For the adjustment of the molecular weight of the polycarbonate resin, phenol, p-tert-butylphenol, p-tert-octylphenol, p-cumylphenol and the like are used.

In this case, it is necessary that the amount of the terminating agent is adjusted to make the fraction of hydroxyl end groups of less than 7% by mole in the form of pellets described later.

The polycarbonate resin will be described under assumption where it is obtained by the solution process.

A polycarbonate solution after polycondensation is washed for purification in various kinds of known methods, and the purified polycarbonate solution is then pelletized in various kinds of known methods.

In the case where the free total phenol content of the polycarbonate resin obtained in the foregoing process is large, it is preferred that an elution treatment is carried out by using a solvent, such as acetone, dioxane and the like, to elute free total phenol, so as to make it to 80 ppm or less. In this case, in the form of pellets described later, the elution treatment is carried out in such a manner that the volume average molecular weight is from 10,000 to 17,000, the fraction of hydroxyl end groups is less than 7% by mole, and the free total phenol content is 80 ppm or less.

A releasing agent and, depending on necessity, from 20 to 100 ppm of a phosphorous antioxidant are added to the dried polycarbonate resin flakes after the elution treatment, and it is then pelletized by an extruder. It is necessary that the releasing agent in the pellets is from 100 to 500 ppm (preferably from 150 to 350 ppm).

When the releasing agent is less than 100 ppm, occurrence of defects due to flash caused by releasing failure is increased, whereas when it exceeds 500 ppm, defects of polarization and white turbidity as an optical disk are liable to be occur, and thus both cases are not preferred.

As for the releasing agent, those described for the first invention can be applied.

As for the phosphorous antioxidant, those described for the first invention can also be applied.

As described in the foregoing, it is necessary that the polycarbonate resin in a form of pellets has a viscosity average molecular weight of from 10,000 to 17,000 and a fraction of hydroxyl end groups of less than 7% by mole. When the fraction of hydroxyl end groups is too large, defects due to flash frequently occur. It is preferred that the free total phenol content is 80 ppm or less from the standpoint of prevention of occurrence of defects due to flash.

When the viscosity average molecular weight is less than 10,000, the mechanical strength of the molded article is lowered, whereas when it exceeds 17,000, distortion remains in the molded article due to shortage of flowability upon molding, so as to lower the optical characteristics, and therefore both the cases are not preferred.

The measurement methods of the impurity amounts in bisphenol A and the fraction of hydroxyl end groups and the free total phenol content of the polycarbonate resin are as follows.

(1) Impurity Amounts in Bisphenol A

A sample is dissolved in acetonitrile, and quantitative analysis is carried out with liquid chromatography by using a known substance as reference.

(2) Fraction of Hydroxyl End Groups (In the Case Where p-t-butylphenol is Used as a Terminating Agent)

A sample is dissolved in heavy chloroform and measured for $^1$HNMR. The proton amount A in the ortho position and the proton amount B of the butyl group of the p-t-butylphenyl group as an end group are obtained with respect to the OH group, and it is calculated by the following equation.

$$\text{Fraction of hydroxyl end groups (\% by mole)} = 100 \times (A/2)/((A/2)+(B/9))$$

(3) Free Total Phenol Amount

The analysis method is the same as described for the first invention.

The optical disk substrate of the invention is molded in the molding methods described for the first invention. Among these, the injection molding method using a stamper is preferred.

The invention will be then described more specifically with reference to examples and comparative examples.

EXAMPLE II-1

1,000 kg of phenol and 100 kg of acetone were mixed, to which hydrochloric acid was added to carry out a condensation reaction at 65° C. for 4 hours. The reaction solution was distilled to recover hydrochloric acid, water and a certain amount of phenol from the top of the tower. The matter at the bottom of the tower contained 32.0% by mass of bisphenol A, 64.4% by mass of phenol and 3.6% by mass of other compounds. A phenol solution of the bisphenol A was allowed to stand for 2 hours under the condition where it was cooled to 55° C. The solution was in a form of slurry containing a phenol adduct of bisphenol A. It was then subjected to suction filtration with a strainer, and the resulting crystals were washed with phenol to obtain a crystal sample (a). The crystal sample (a) was melted at 165° C., and phenol was distilled off under reduced pressure to obtain bisphenol A (b). The impurity concentrations of the bisphenol A (b) were 1,200 ppm for 2,4-bisphenol A, 200 ppm for a cyclic IPP dimer and 160 ppm for trisphenol.

To 100 kg of the phenol adduct of bisphenol A obtained in the course of the process for obtaining the crystal sample (a), 100 kg of phenol was added and dissolved under heating to 95° C. When the phenol solution of bisphenol A was allowed to stand for 2 hours under the state where it was cooled to 55° C., the solution was in the form of slurry containing crystals of the phenol adduct of bisphenol A. It was then subjected to suction filtration, and the resulting crystals was washed with phenol to obtain a crystal sample (c). The crystal sample (c) was melted at 165° C., and phenol was distilled off under reduced pressure, it was cooled under stirring to obtain bisphenol A (d) in a form of flakes. The impurity concentrations of the bisphenol A (d) were 180 ppm for 2,4-bisphenol A, 10 ppm for the cyclic IPP dimer and 20 ppm for trisphenol.

Polymerization was carried out by using the bisphenol A (d) under the following conditions.

(1) Preparation of Polycarbonate Oligomer

To 400 L of a 5% by mass sodium hydroxide aqueous solution, 60 kg of bisphenol A was dissolved to prepare a sodium hydroxide solution of bisphenol A.

Then, the sodium hydroxide solution of bisphenol A maintained at room temperature was introduced at a flow rate of 138 L/hr and methylene chloride was introduced at a flow rate of 69 L/hr to a tubular reactor having an inner diameter of 10 mm and a tube length of 10 m through an orifice plate, to which phosgene was blown at a flow rate of 10 kg/hr, so as to carry out a reaction for 3 hours in a continuous manner. The tubular reactor used herein had a double tube structure, and cooling water is passed through the jacket part to maintain the discharging temperature of the reaction liquid to 25° C.

The pH of the discharged liquid was adjusted to from 10 to 11. The thus resulting reaction liquid was allowed to stand to separate and remove an aqueous phase, whereby a methylene chloride phase (220 L) was collected to obtain a polycarbonate oligomer solution.

(2) Production of Polycarbonate

To 10 L of the polycarbonate oligomer solution obtained in the item (1), 118 g of p-t-butylphenol was dissolved, to which a sodium hydroxide aqueous solution (NaOH: 75 g, water: 1 L) and 1.17 mL of triethylamine were added, and stirred at 300 rpm at ordinary temperature for 30 minutes. 8 L of methylene chloride and a sodium hydroxide aqueous solution of bisphenol A (bisphenol A: 607 g, NaOH: 320 g, water: 5 L) were then added thereto and stirred at 500 rpm at ordinary temperature for one hour. Thereafter, 5 L of methylene chloride was added and stirred at 500 rpm at ordinary temperature for 10 minutes. After termination of stirring, standing separation was carried out to obtain an organic phase. The organic phase was alkali-washed with 5 L of a 0.03 N sodium hydroxide aqueous solution, washed with 5 L of 0.2 N hydrochloric acid, and washed with 5 L of water (twice) in this order, and then methylene chloride was distilled off to obtain polycarbonate in a flake form. The resulting polycarbonate flakes were dried in vacuum at 120° C. for 48 hours, so as to obtain polycarbonate flakes having a viscosity average molecular weight of 14,500. About 50 kg of polycarbonate flake was obtained in the similar operations.

To the resulting polycarbonate in a flake form, 300 ppm of glycerin monostearate as a releasing agent and 40 ppm of tris(2,4-di-t-butylphenyl)phosphite as a phosphorous antioxidant were added, and then pelletized with an extruder. The pellets had a fraction of hydroxyl end groups of 4% by mole, a free total phenol amount of 40 ppm and a glycerin monostearate content of 280 ppm. The pellets were fed to an injection molding machine (DISK5, produced by Sumitomo Heavy Industries, Ltd.), and 600 pieces of disk substrates having a diameter of 130 mm and a thickness of 1.2 mm under the following conditions.
Cylinder temperature: 325° C.
Metallic mold temperature: 90° C. (stamper side)/85° C.
Stamper: for CD-ROM The resulting disk substrates were examined with a flaw defect inspection machine, and as a result, the defects due to flash were 4.5%. The disk substrates were subjected to accelerated deterioration under constant temperature and humidity of 90° C. and 90% for 300 hours, and the block error rate was 5 when they were measured with an electric characteristics inspection machine.

Comparative Example II-1

Polymerization was carried out in the same manner as in Example II-1 by using the bisphenol A (d) produced in Example 1 to obtain polycarbonate flakes having a viscosity average molecular weight of 14,500. To the resulting polycarbonate in a flake form, 30 ppm of glycerin monostearate as a releasing agent and 40 ppm of tris(2,4-di-t-butylphenyl) phosphite as a phosphorous antioxidant were added, and then pelletized with an extruder. The pellets had a fraction of hydroxyl end groups of 4% by mole, a free total phenol amount of 40 ppm and a glycerin monostearate content of 20 ppm. 600 pieces of disk substrates were produced by using the pellets in the same manner as in Example II-1. The resulting disk substrates were examined with a flaw defect inspection machine, and as a result, the defects due to flash were 11.0%.

Comparative Example II-2

Polymerization was carried out by the phosgene method using the bisphenol A (d) produced in Example II-1 to obtain polycarbonate flakes having a viscosity average molecular weight of 14,500. To the resulting polycarbonate in a flake form, 600 ppm of glycerin monostearate as a releasing agent and 40 ppm of tris(2,4-di-t-butylphenyl)phosphite as a phosphorous antioxidant were added, and then pelletized with an extruder. The pellets had a fraction of hydroxyl end groups of 4% by mole, a free total phenol amount of 40 ppm and a glycerin monostearate content of 560 ppm. 600 pieces of disk substrates were produced by using the pellets in the same manner as in Example II-1. The resulting disk substrates were examined with a flaw defect inspection machine, and as a result, the defects due to flash were 4.0%, but after the disk substrates were subjected to accelerated deterioration under constant temperature and humidity of 90° C. and 90% for 300 hours, the block error rate was 26 when they were measured with an electric characteristics inspection machine.

Comparative Example II-3

Polymerization was carried out in the same manner as in Example II-1 by using the bisphenol A (b) produced in the course of Example II-1 to obtain polycarbonate flakes having a viscosity average molecular weight of 14,500. To the resulting polycarbonate in a flake form, 300 ppm of glycerin monostearate as a releasing agent and 40 ppm of tris(2,4-di-t-butylphenyl)phosphite as a phosphorous antioxidant were added, and then pelletized with an extruder. The pellets had a fraction of hydroxyl end groups of 8% by mole, a free total phenol amount of 90 ppm and a glycerin monostearate content of 280 ppm. 600 pieces of disk substrates were produced by using the pellets in the same manner as in Example II-1. The resulting disk substrates were examined with a flaw defect inspection machine, and as a result, the defects due to flash were 15.0%.

III. Third Invention

The third invention (sometimes simply referred to as an "invention" in this chapter) will be described in detail.

A polycarbonate resin used in the optical disk substrate of the invention will be described.

The chemical structure and the production process of the polycarbonate resin are not particularly limited, and various kinds thereof can be used. For example, an aromatic polycarbonate resin produced through a reaction between a dihydric phenol and a carbonate precursor is preferably used. The production process that can be used may be either the solution process or the molten process.

As for the dihydric phenol, those described for the first invention can be applied. As for the polycarbonate precursor, those described for the first invention can be applied. As for the chemical structure of the polycarbonate resin, those described for the first invention can be applied.

The polycarbonate resin generally has a viscosity average molecular weight of from 10,000 to 30,000. The viscosity average molecular weight (Mv) can be obtained in the same manner as described for the first invention.

A releasing agent and, depending on necessity, from 20 to 100 ppm of a phosphorous antioxidant are added to the polycarbonate resin flakes thus produced in the foregoing process, and it is then pelletized by an extruder. It is necessary that the releasing agent in the pellets is from 100 to 500 ppm (preferably from 150 to 350 ppm).

When the releasing agent is less than 100 ppm, occurrence of defects due to flash caused by releasing failure is increased, whereas when it exceeds 500 ppm, defects of polarization and white turbidity as an optical disk are liable to be occur, and thus both cases are not preferred.

The pellets have a viscosity average molecular weight of from 10,000 to 17,000 and an iron content is 0.2 ppm or less, and when an intensity of a chemical shift δ of from 7.0 to 7.5 ppm based on a phenyl ring in a spectrum measured with $^1$H-NMR is 1,000, signal intensities at δ of from 1.02 to 1.08 and from 6.69 to 6.73 are 0.01 or less. It is considered that the signals at δ of from 1.02 to 1.08 and from 6.69 to 6.73 are ascribed to certain impurities.

In order to the iron content and the $^1$H-NMR spectrum among the foregoing characteristics, it is more effective, while not limited, to purify during the production of the bisphenol A in that unreacted acetone, by-produced water and alkylmercaptan as an auxiliary catalyst are removed by distillation from the mixture of phenol and acetone after the reaction, and the residue thus obtained is made in contact with an acidic ion exchange resin.

As for the releasing agent, those described for the first invention can be applied.

As for the phosphorous antioxidant, those described for the first invention can be applied.

As described in the foregoing, it is necessary that the polycarbonate resin has, in the form of pellets, a viscosity average molecular weight of from 10,000 to 17,000 and an iron content is 0.2 ppm or less, and when an intensity of a chemical shift δ of from 7.0 to 7.5 ppm based on a phenyl ring in a spectrum measured with $^1$H-NMR is 1,000, signal intensities at δ of from 1.02 to 1.08 and from 6.69 to 6.73 ppm are 0.01 or less. When the iron content is too large or the conditions for the $^1$H-NMR are not satisfied, defects due to flash frequently occur.

When the viscosity average molecular weight is less than 10,000, the mechanical strength of the molded article is lowered, whereas when it exceeds 17,000, distortion remains in the molded article due to shortage of flowability upon molding, so as to lower the optical characteristics, and therefore both the cases are not preferred. The measurement methods of the iron content and $^1$H-NMR are as follows.

(1) Iron Content

After ashing a sample, it was quantitatively analyzed by the graphite furnace atomic absorption spectrometry.

(2) $^1$H-NMR 40 mg of a sample was collected in an NMR sample tube having a diameter of 5 mm and uniformly dissolved in 0.6 mL of heavy chloroform at room temperature, and it was measured for $^1$H-NMR with a 500 MHz NMR produced by JEOL Ltd. (LAMBDA-500) under the following conditions.

Measurement Conditions

Pulse width: 45 degree

Pulse repetition time: 9 sec

Accumulation number: 256 times

Chemical shift standard: tetramethylsilane

Measurement temperature: room temperature

BF value: 0.15

The optical disk substrate of the invention is molded in the molding methods described for the first invention. Among these, the injection molding method using a stamper is preferred.

The invention will be then described more specifically with reference to examples and comparative examples.

EXAMPLE III-1

(1) Production of Bisphenol A

A packed layer type reactor having an inner diameter of 20 mm and a height of 1,500 mm was filled with a sulfonic acid type cation exchange resin (Diaion 104H, produced by Mitsubishi Chemical Co., Ltd.). While maintaining the reaction temperature at 80° C., phenol, acetone and ethylmercaptan were put thereinto from an inlet of the reactor at a ratio phenol/acetone (molar ratio)=10, a ratio acetone/mercaptan (molar ratio)=20 and LHSV=1 Hr$^{-1}$, so as to carry out the reaction. When the acetone conversion was stabilized at 75%, unreacted acetone, by-produced water and part of excessive phenol were distilled off from the reaction mixture at a pressure of 66.6 kPa and a temperature of 172° C. The tower bottom liquid was made in contact with a sulfonic acid type cation exchange resin (Diaion 104H, produced by Mitsubishi Chemical Co., Ltd.) filled in a packed layer type reactor having an inner diameter of 20 mm and a height of 1,500 mm at a temperature of 80° C. and LHAV=3 Hr$^{-1}$. From the liquid thus being made in contact, excessive phenol was distilled off at a pressure of 15.7 kPa and a temperature of 134° C., so as to concentrate the bisphenol A concentration to 40% by mass. The concentrated liquid was cooled to 43° C. to crystallize the phenol adduct, followed by subjecting to solid-liquid separation. Phenol was removed from the phenol adduct at a pressure of 4.0 kPa and a temperature of 170° to obtain bisphenol A.

(2) Preparation of Polycarbonate Oligomer

To 400 L of a 5% by mass sodium hydroxide aqueous solution, 60 kg of the bisphenol A produced in the foregoing manner was dissolved to prepare a sodium hydroxide solution of bisphenol A.

Then, the sodium hydroxide solution of bisphenol A maintained at room temperature was introduced at a flow rate of 138 L/hr and methylene chloride was introduced at a flow rate of 69 L/hr to a tubular reactor having an inner diameter of 10 mm and a tube length of 10 m through an orifice plate, to which phosgene was blown at a flow rate of 10 kg/hr, so as to carry out a reaction for 3 hours in a continuous manner. The tubular reactor used herein had a double tube structure, and cooling water is passed through the jacket part to maintain the discharging temperature of the reaction liquid to 25° C.

The pH of the discharged liquid was adjusted to from 10 to 11. The thus resulting reaction liquid was allowed to stand to separate and remove an aqueous phase, whereby a methylene chloride phase (220 L) was collected to obtain a polycarbonate oligomer solution.

(3) Production of Polycarbonate

To 10 L of the polycarbonate oligomer solution obtained in the item (2), 118 g of p-t-butylphenol was dissolved, to which a sodium hydroxide aqueous solution (NaOH: 75 g, water: 1 L) and 1.17 mL of triethylamine were added, and stirred at 300 rpm at ordinary temperature for 30 minutes. 8 L of methylene chloride and a sodium hydroxide aqueous solution of bisphenol A (bisphenol A: 607 g, NaOH: 320 g, water: 5 L) were then added thereto and stirred at 500 rpm at ordinary temperature for one hour. Thereafter, 5 L of methylene chloride was added and stirred at 500 rpm at ordinary temperature for 10 minutes. After termination of stirring, standing separation was carried out to obtain an organic phase. The organic phase was alkali-washed with 5 L of a 0.03 N sodium hydroxide aqueous solution, washed with 5 L of 0.2 N hydrochloric acid, and washed with 5 L of water (twice) in this order, and then methylene chloride was distilled off to obtain polycarbonate in a flake form. The resulting polycarbonate flakes were dried in vacuum at 120° C. for 48 hours, so as to obtain polycarbonate flakes having a viscosity average molecular weight of 14,500. About 50 kg of polycarbonate flake was obtained in the similar operations.

(4) Production of Pellets

Figure 2:
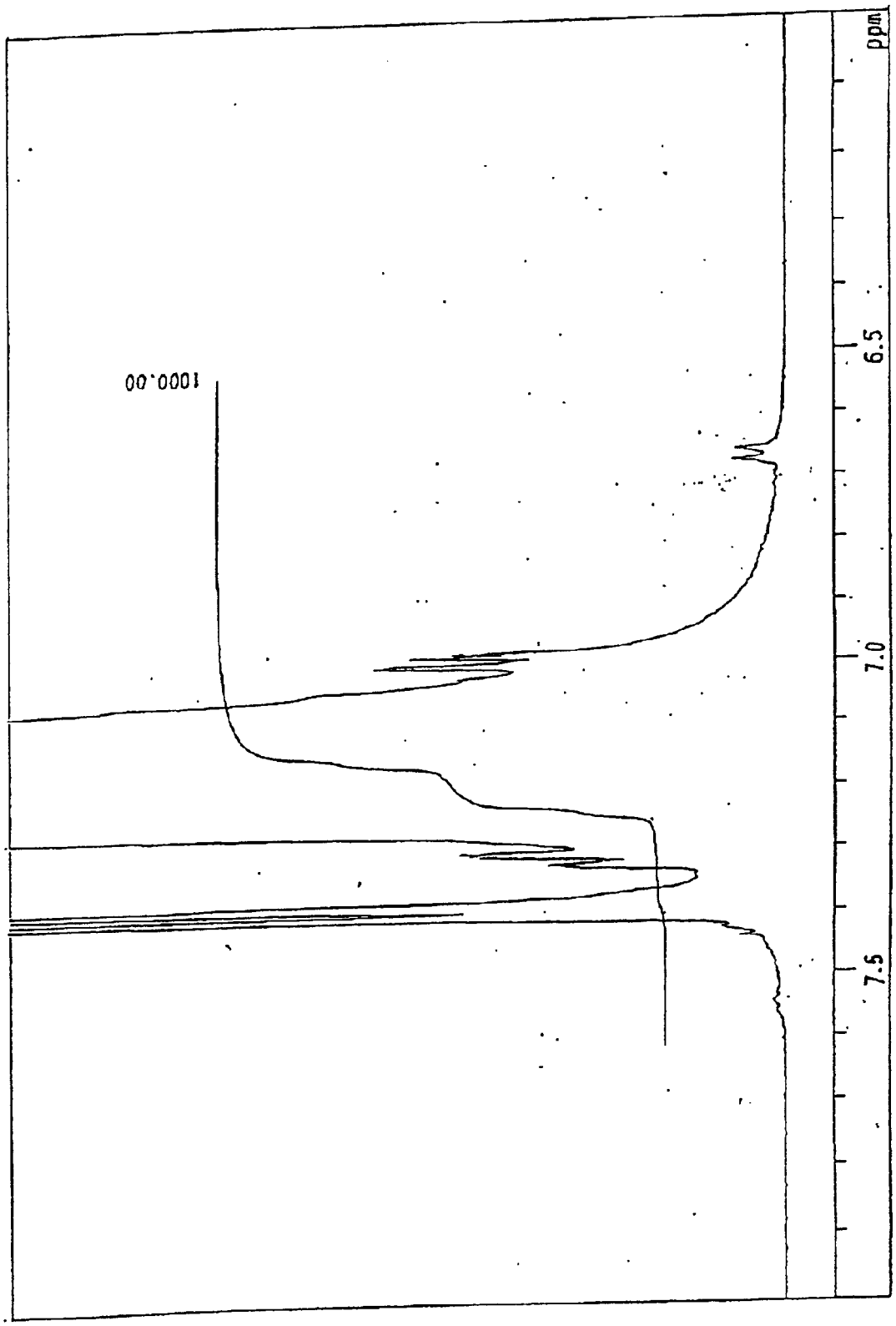
FIG. 2 shows a $^1$H-NMR spectrum chart (6 to 8 ppm) in Example III-1, Comparative Example III-2 and Comparative Example III-3.
Figure 5:
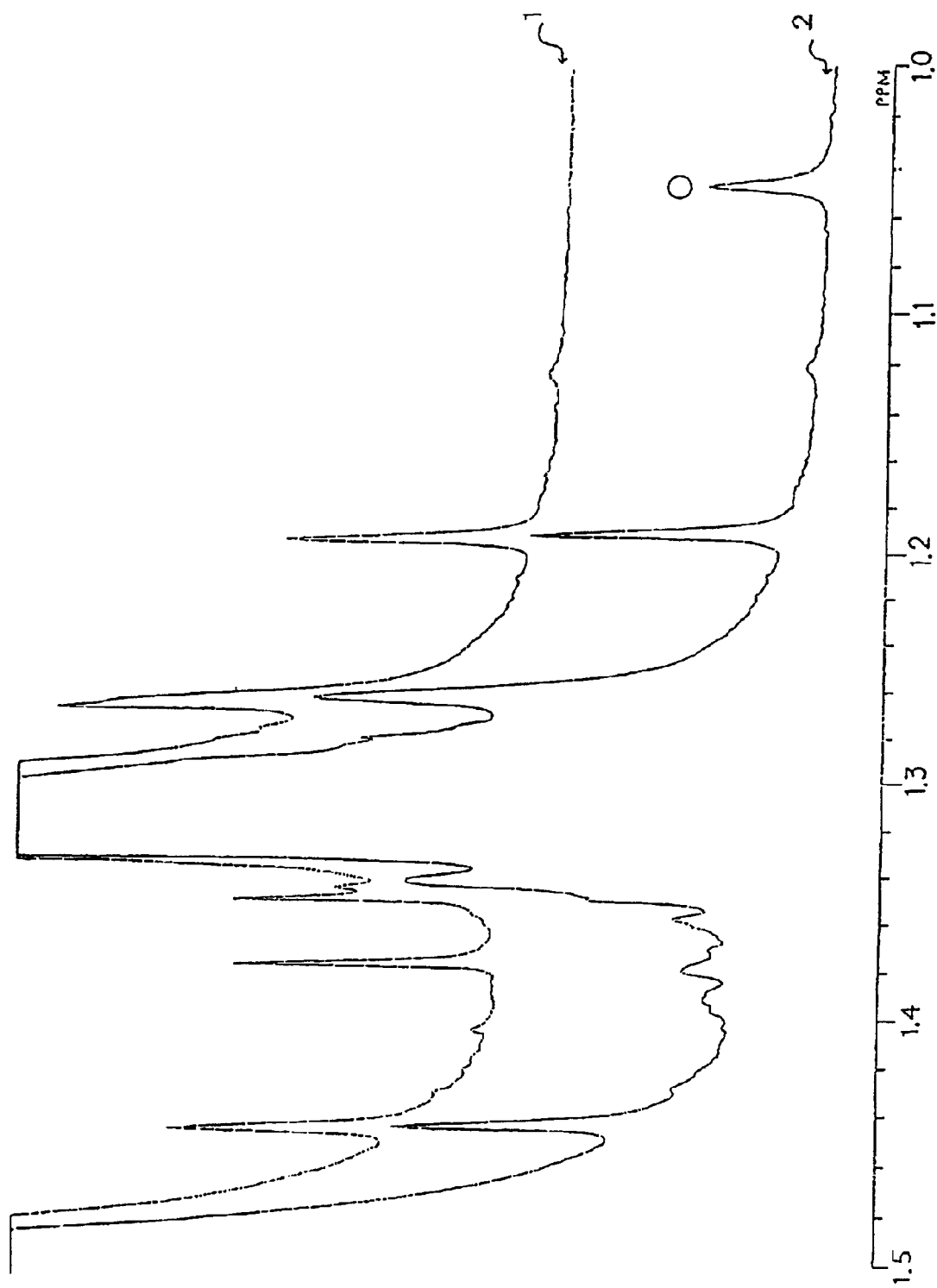
FIG. 5 shows an enlarged chart of $^1$H-NMR spectrum (1.0 to 1.5 ppm) in Example III-1, Comparative Example III-1, Comparative Example III-2 and Comparative Example III-3.
Figure 6:
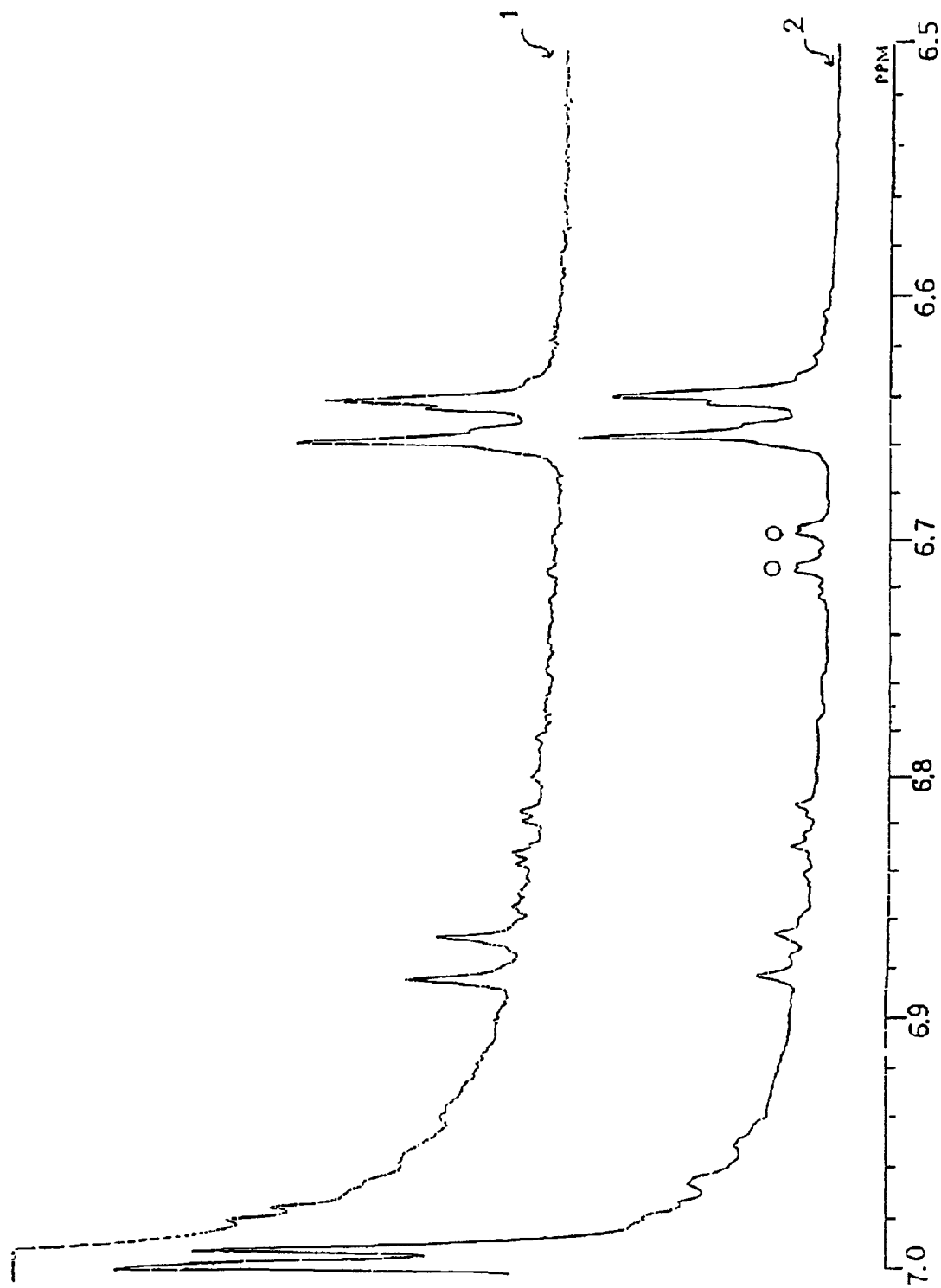
FIG. 6 shows an enlarged chart of $^1$H-NMR spectrum (6.5 to 7.0 ppm) in Example III-1, Comparative Example III-1, Comparative Example III-2 and Comparative Example III-3.

To the polycarbonate in a flake form obtained in the item (3), 300 ppm of glycerin monostearate as a releasing agent and 40 ppm of tris(2,4-di-t-butylphenyl)phosphite as a phosphorous antioxidant were added, and then pelletized with an extruder. The pellets had a viscosity average molecular weight of 14,200, an iron content of 0.1 ppm, when an intensity of a chemical shift δ of from 7.0 to 7.5 ppm based on a phenyl ring in a spectrum measured with $^1$H-NMR was 1,000, signal intensities at δ of from 1.02 to 1.08 and from 6.69 to 6.73 of 0 (not detected) (see FIGS. 1, 2, 5 and 6), and a releasing agent amount of 250 ppm.

(5) Molding and Examination

The pellets obtained in the item (4) were fed to an injection molding machine (DISK5, produced by Sumitomo Heavy Industries, Ltd.), and 600 pieces of disk substrates having a diameter of 130 mm and a thickness of 1.2 mm under the following conditions.

Cylinder temperature: 325° C.

Metallic mold temperature: 90° C. (stamper side)/85° C.

Stamper: for CD-ROM

The resulting disk substrates were examined with a flaw defect inspection machine, and as a result, the defects due to flash were 4.5%. The disk substrates were subjected to accelerated deterioration under constant temperature and humidity of 90° C. and 90% for 300 hours, and the block error rate was 6 when they were measured with an electric characteristics inspection machine.

Comparative Example III-1

(1) Production of Bisphenol A

Bisphenol A was produced in the same manner as in the item (1) of Example III-1 except that the tower bottom liquid obtained by removing unreacted acetone, by-produced water and part of excessive phenol from the mixture after the reaction was not made in contact with a sulfonic acid type cation exchange resin.

(2) Preparation of Polycarbonate Oligomer

A polycarbonate oligomer solution was obtained in the same manner as in the item (2) of Example III-1 by using the bisphenol A produced in the item (1) of Comparative Example III-1.

(3) Production of Polycarbonate

Polycarbonate flakes having a viscosity average molecular weight of 14,300 were obtained in the same manner as in the item (3) of Example III-1 by using the polycarbonate oligomer solution produced in the item (2) of Comparative Example III-1.

(4) Production of Pellets

Figure 3:
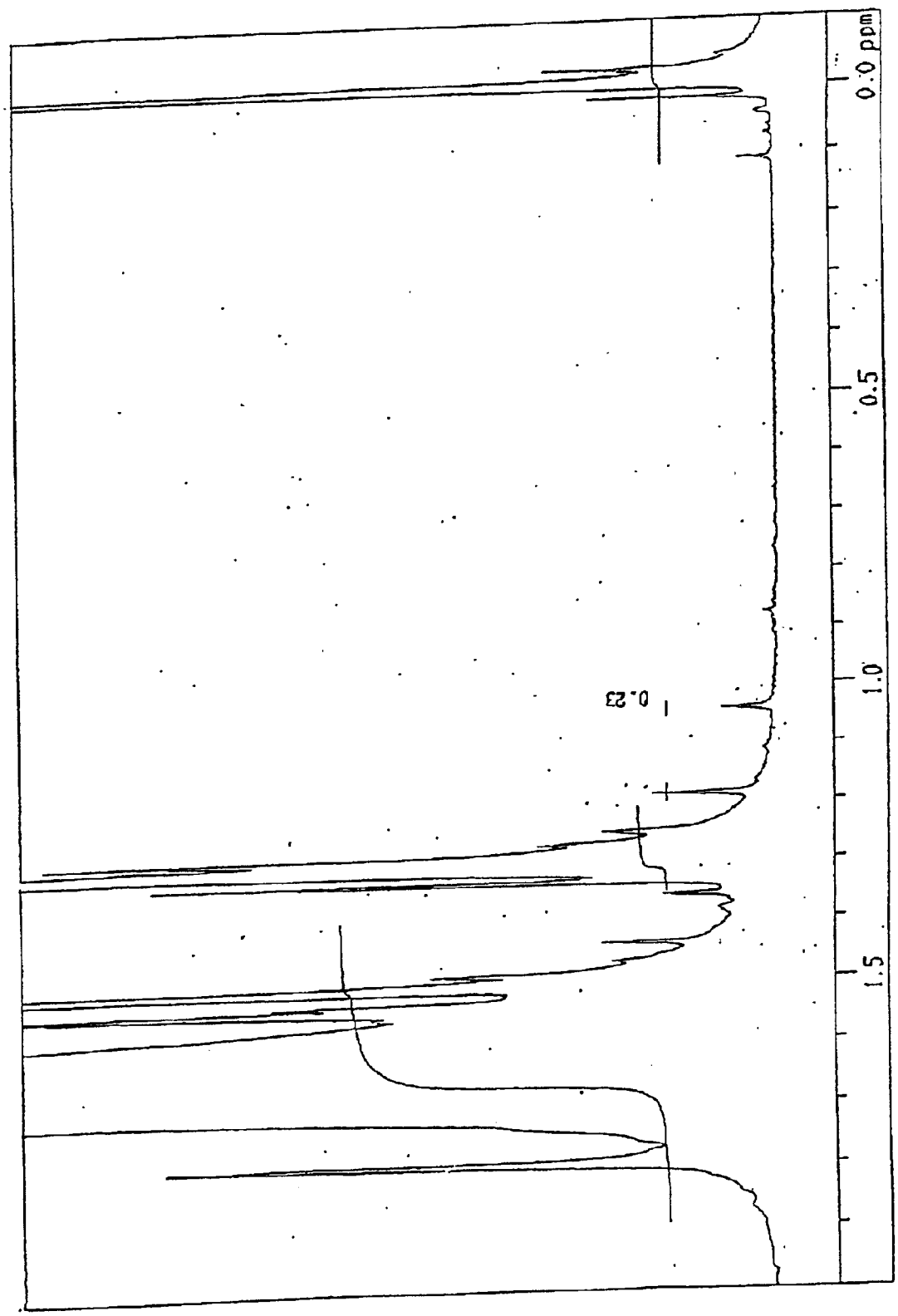
FIG. 3 shows a $^1$H-NMR spectrum chart (0 to 2 ppm) in Comparative Example III-1.
Figure 4:
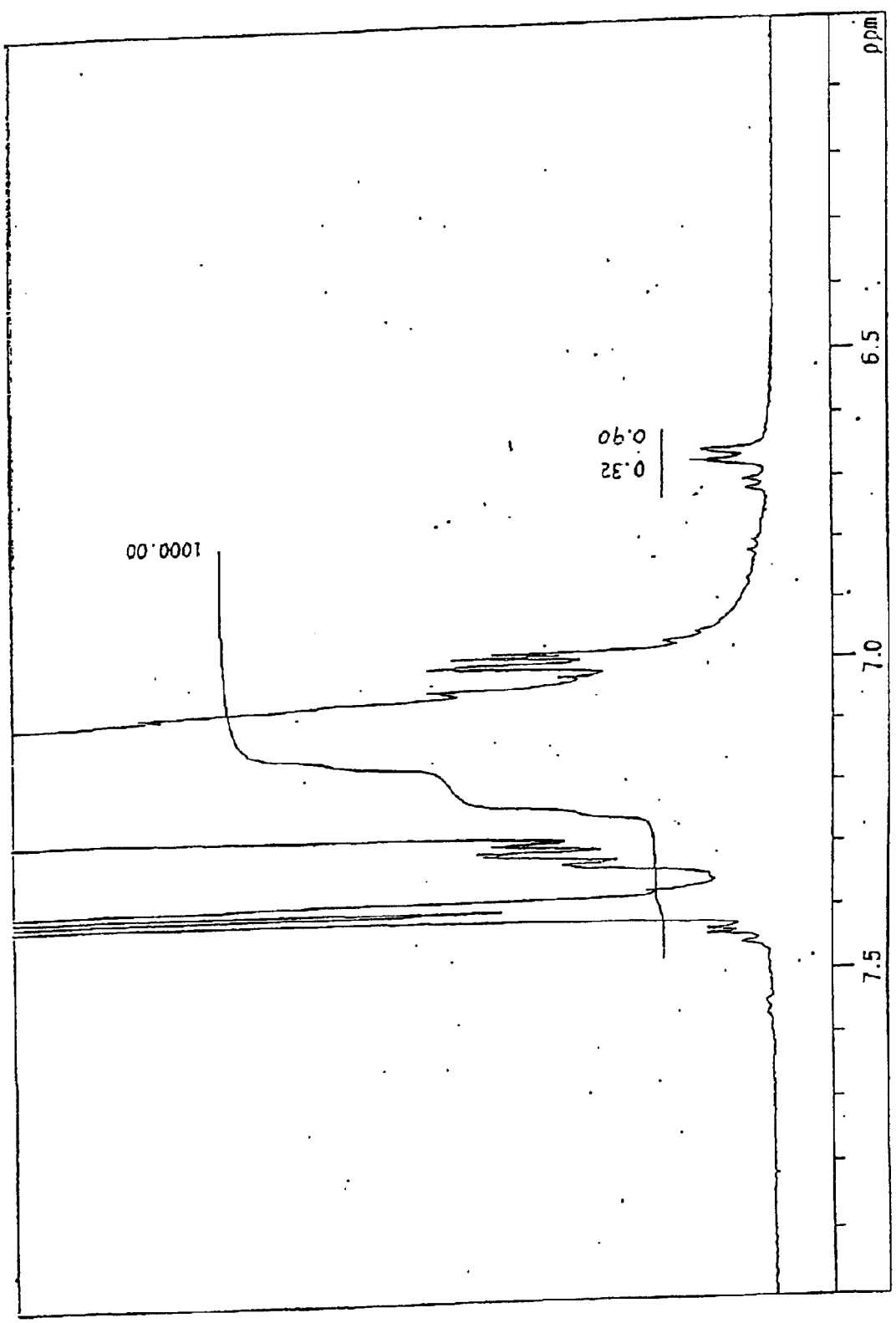
FIG. 4 shows a $^1$H-NMR spectrum chart (6 to 8 ppm) in Comparative Example III-1.

To the polycarbonate in a flake form obtained in the item (3), 300 ppm of glycerin monostearate as a releasing agent and 40 ppm of tris(2,4-di-t-butylphenyl)phosphite as a phosphorous antioxidant were added, and then pelletized with an extruder. The pellets had a viscosity average molecular weight of 14,000, an iron content of 0.3 ppm and a releasing agent content of 250 ppm, and when an intensity of a chemical shift δ of from 7.0 to 7.5 ppm based on a phenyl ring in a spectrum measured with $^1$H-NMR was 1,000, a single signal appeared at δ=1.04 ppm with an intensity of 0.23 and signals appeared at δ=6.69 and 6.71 ppm with intensities of 0.90 and 0.32 (see FIGS. 3 to 6).

(5) Molding and Examination 600 pieces of disk substrates having a diameter of 130 mm and a thickness of 1.2 mm were produced by using the pellets obtained in the item (4) in the same manner as in the item (5) of Example III-1.

The resulting disk substrates were examined with a flaw defect inspection machine, and as a result, the defects due to flash were 15%.

Comparative Example III-2

(1) Production of Bisphenol A

Bisphenol A was produced in the same manner as in the item (1) of Example III-1.

(2) Preparation of Polycarbonate Oligomer

A polycarbonate oligomer solution was obtained in the same manner as in the item (2) of Example III-1.

(3) Production of Polycarbonate

Polycarbonate flakes were obtained in the same manner as in the item (3) of Example III-1.

(4) Production of Pellets

To the polycarbonate in a flake form obtained in the item (3), 600 ppm of glycerin monostearate as a releasing agent and 40 ppm of tris(2,4-di-t-butylphenyl)phosphite as a phosphorous antioxidant were added, and then pelletized with an extruder. The pellets had a viscosity average molecular weight of 14,200, an iron content of 0.1 ppm, and when an intensity of a chemical shift δ of from 7.0 to 7.5 ppm based on a phenyl ring in a spectrum measured with $^1$H-NMR was 1,000, signal intensities at δ of from 1.02 to 1.08 and from 6.69 to 6.73 of 0 (not detected) (see FIGS. 1, 2, 5 and 6), and a releasing agent amount of 530 ppm.

(5) Molding and Examination 600 pieces of disk substrates having a diameter of 130 mm and a thickness of 1.2 mm were produced by using the pellets obtained in the item (4) in the same manner as in the item (5) of Example III-1.

The resulting disk substrates were examined with a flaw defect inspection machine, and as a result, the defects due to flash were 3.9%. After the disk substrates were subjected to accelerated deterioration under constant temperature and humidity of 90° C. and 90% for 300 hours, the block error rate was 29 when they were measured with an electric characteristics inspection machine.

Comparative Example III-3

(1) Production of Bisphenol A

Bisphenol A was produced in the same manner as in the item (1) of Example III-1.

(2) Preparation of Polycarbonate Oligomer

A polycarbonate oligomer solution was obtained in the same manner as in the item (2) of Example III-1.

(3) Production of Polycarbonate

Polycarbonate flakes were obtained in the same manner as in the item (3) of Example III-1.

(4) Production of Pellets

To the polycarbonate in a flake form obtained in the item (3), 30 ppm of glycerin monostearate as a releasing agent and 40 ppm of tris(2,4-di-t-butylphenyl)phosphite as a phosphorous antioxidant were added, and then pelletized with an extruder. The pellets had a viscosity average molecular weight of 14,200, an iron content of 0.1 ppm, and when an intensity of a chemical shift $\delta$ of from 7.0 to 7.5 ppm based on a phenyl ring in a spectrum measured with $^1$H-NMR was 1,000, signal intensities at $\delta$ of from 1.02 to 1.08 and from 6.69 to 6.73 of 0 (not detected) (see FIGS. 1, 2, 5 and 6), and a releasing agent amount of 20 ppm.

(5) Molding and Examination 600 pieces of disk substrates having a diameter of 130 mm and a thickness of 1.2 mm were produced by using the pellets obtained in the item (4) in the same manner as in the item (5) of Example III-1.

The resulting disk substrates were examined with a flaw defect inspection machine, and as a result, the defects due to flash were 18%.

IV. Fourth Invention

The fourth invention (sometimes simply referred to as an "invention" in this chapter) will be described in detail.

A polycarbonate resin used in the optical disk substrate of the invention will be described.

The chemical structure and the production process of the polycarbonate resin are not particularly limited, and various kinds thereof can be used. For example, an aromatic polycarbonate resin produced through a reaction between a dihydric phenol and a carbonate precursor is preferably used. The production process that can be used may be either the solution process or the molten process.

As for the dihydric phenol, those described for the first invention can be applied. As for the polycarbonate precursor, those described for the first invention can be applied. As for the chemical structure of the polycarbonate resin, those described for the first invention can be applied.

The polycarbonate resin generally has a viscosity average molecular weight of from 10,000 to 30,000. The viscosity average molecular weight (Mv) can be obtained in the same manner as described for the first invention.

A releasing agent and, depending on necessity, from 20 to 100 ppm of a phosphorous antioxidant are added to the polycarbonate resin flakes thus produced in the foregoing process, and it is then pelletized by an extruder. It is necessary that the releasing agent in the pellets is from 100 to 500 ppm (preferably from 150 to 350 ppm).

When the releasing agent is less than 100 ppm, occurrence of defects due to flash caused by releasing failure is increased, whereas when it exceeds 500 ppm, defects of polarization and white turbidity as an optical disk are liable to be occur, and thus both cases are not preferred.

It is necessary that the pellets have a viscosity average molecular weight of from 10,000 to 17,000, an iron content is 0.2 ppm or less, and a fraction of hydroxyl end groups of less than 7% by mole. The fraction of hydroxyl end groups herein is a ratio (% by mole) of hydroxyl end groups with respect to the total end groups of the polycarbonate and is a value measured in the measuring method described later.

Among the foregoing characteristics, in order to satisfy the iron content and the fraction of hydroxyl end groups, for example, the method of purifying during the production of the bisphenol A described in JP-A-6-48970 is more effective, while not limited, in that after washing the adduct of bisphenol A and phenol with purified phenol, it is decomposed into phenol and bisphenol A, and the phenol is recycled to the reaction system.

As for the releasing agent, those described for the first invention can be applied.

As for the phosphorous antioxidant, those described for the first invention can be applied.

As described in the foregoing, it is necessary that the polycarbonate resin has, in the form of pellets, a viscosity average molecular weight of from 10,000 to 17,000, an iron content is 0.2 ppm or less, and a fraction of hydroxyl end groups of less than 7% by mole. When the iron content is too large or the fraction of hydroxyl end groups is too high, defects due to flash frequently occur.

When the viscosity average molecular weight is less than 10,000, the mechanical strength of the molded article is lowered, whereas when it exceeds 17,000, distortion remains in the molded article due to shortage of flowability upon molding, so as to lower the optical characteristics, and therefore both the cases are not preferred. The measurement methods of the iron content and the fraction of hydroxyl end groups are as follows.

(1) Iron Content

After ashing a sample, it was quantitatively analyzed by the graphite furnace atomic absorption spectrometry.

(2) Fraction of Hydroxyl End Groups (In the Case Where p-t-butylphenol is Used as a Terminating Agent)

40 mg of a sample was collected in an NMR sample tube having a diameter of 5 mm and uniformly dissolved in 0.6 mL of heavy chloroform at room temperature. It was measured for $^1$H-NMR with a 500 MHz NMR produced by JEOL Ltd. (LAMBDA-500) under the following conditions.

Measurement Conditions

Pulse width: 45 degree

Pulse repetition time: 9 sec

Accumulation number: 256 times

Chemical shift standard: tetramethylsilane

Measurement temperature: room temperature

BF value: 0.15

In the NMR spectrum, the characteristic signal intensity of o-phenyl in the vicinity of the terminal OH at $\delta$=6.6 ppm is designated as X, the characteristic signal intensity of t-butyl at $\delta$=1.3 ppm is designated as Y, and it is obtained by the following equation.

$$\text{Fraction of hydroxyl end groups (\% by mole)} = 100 \times (X/2)/((X/2)+(Y/9))$$

The optical disk substrate of the invention is molded in the molding methods described for the first invention. Among these, the injection molding method using a stamper is preferred.

The invention will be then described more specifically with reference to examples and comparative examples.

EXAMPLE IV-1

(1) Production of Bisphenol A

According to the production scheme of bisphenol A shown in FIG. 7, bisphenol was produced by a continuous process. Phenol, acetone and ethylmercaptan were continuously introduced to a reactor 1 having 600 g of a cationic resin filled therein at rates of 4,600 g/hr, 280 g/hr and 16 g/hr, respectively, while maintaining the temperature at 75° C. A reaction mixture 2 was introduced to a concentrating step 3 and concentrated under the conditions of 165° C. and 53.3 kPa to make a concentration of bisphenol A of 30% by mass, and a concentrated liquid 4 was then introduced to a crystallizing step 5 and subjected to a cooling treatment under conditions of 45° C., whereby an adduct of bisphenol A and phenol was crystallized. A slurry 6 of the adduct was then transported to a separating step 7 and separated into adduct crystals and a mother liquid. The adduct crystals 8 was washed with purified phenol in an amount 0.5 time (by weight) the amount of the wet cake, and the adduct crystals 10 thus washed was subjected to recrystallization and then transported to a adduct decomposition step 11. In the adduct decomposition step, the adduct was decomposed under conditions of 2.6 kPa and 170° C., whereby the most amount of phenol was distilled off. The whole amount of the distilled phenol 12 was recycled to the reactor 1. On the other hand, residual phenol was removed substantially completely by steam striping from bisphenol A 13 taken out from the decomposition step 11, so as to obtain bisphenol A as a product.

(2) Preparation of Polycarbonate Oligomer

To 400 L of a 5% by mass sodium hydroxide aqueous solution, 60 kg of the bisphenol A produced in the foregoing manner was dissolved to prepare a sodium hydroxide solution of bisphenol A.

Then, the sodium hydroxide solution of bisphenol A maintained at room temperature was introduced at a flow rate of 138 L/hr and methylene chloride was introduced at a flow rate of 69 L/hr to a tubular reactor having an inner diameter of 10 mm and a tube length of 10 m through an orifice plate, to which phosgene was blown at a flow rate of 10 kg/hr, so as to carry out a reaction for 3 hours in a continuous manner. The tubular reactor used herein had a double tube structure, and cooling water is passed through the jacket part to maintain the discharging temperature of the reaction liquid to 25° C.

The pH of the discharged liquid was adjusted to from 10 to 11. The thus resulting reaction liquid was allowed to stand to separate and remove an aqueous phase, whereby a methylene chloride phase (220 L) was collected to obtain a polycarbonate oligomer solution.

(3) Production of Polycarbonate

To 10 L of the polycarbonate oligomer solution obtained in the item (2), 118 g of p-t-butylphenol was dissolved, to which a sodium hydroxide aqueous solution (NaOH: 75 g, water: 1 L) and 1.17 mL of triethylamine were added, and stirred at 300 rpm at ordinary temperature for 30 minutes. 8 L of methylene chloride and a sodium hydroxide aqueous solution of bisphenol A (bisphenol A: 607 g, NaOH: 320 g, water: 5 L) were then added thereto and stirred at 500 rpm at ordinary temperature for one hour. Thereafter, 5 L of methylene chloride was added and stirred at 500 rpm at ordinary temperature for 10 minutes. After termination of stirring, standing separation was carried out to obtain an organic phase. The organic phase was alkali-washed with 5 L of a 0.03 N sodium hydroxide aqueous solution, washed with 5 L of 0.2 N hydrochloric acid, and washed with 5 L of water (twice) in this order, and then methylene chloride was distilled off to obtain polycarbonate in a flake form. The resulting polycarbonate flakes were dried in vacuum at 120° C. for 48 hours, so as to obtain polycarbonate flakes having a viscosity average molecular weight of 14,500. About 50 kg of polycarbonate flake was obtained in the similar operations.

(4) Production of Pellets

To the polycarbonate in a flake form obtained in the item (3), 300 ppm of glycerin monostearate as a releasing agent and 40 ppm of tris(2,4-di-t-butylphenyl)phosphite as a phosphorous antioxidant were added, and then pelletized with an extruder. The pellets had a viscosity average molecular weight of 14,200, an iron content of 0.1 ppm, a fraction of hydroxyl end groups of 5.4% by mole and a releasing agent amount of 250 ppm.

(5) Molding and Examination

The pellets obtained in the item (4) were fed to an injection molding machine (DISK5, produced by Sumitomo Heavy Industries, Ltd.), and 600 pieces of disk substrates having a diameter of 130 mm and a thickness of 1.2 mm under the following conditions.

Cylinder temperature: 325° C.

Metallic mold temperature: 90° C. (stamper side)/85° C.

Stamper: for CD-ROM

The resulting disk substrates were examined with a flaw defect inspection machine, and as a result, the defects due to flash were 4.5%. The disk substrates were subjected to accelerated deterioration under constant temperature and humidity of 90° C. and 90% for 300 hours, and the block error rate was 6 when they were measured with an electric characteristics inspection machine.

Comparative Example IV-1

(1) Production of Bisphenol A

According to the production scheme of bisphenol A shown in FIG. 8, bisphenol was produced by a continuous process. That is, the same procedures as in the item (1) of Example IV-1 were carried out to produce bisphenol A except that the distilled phenol 12 was not recycled to the reactor 1 but used instead of the purified phenol in the adduct washing step 9.

(2) Preparation of Polycarbonate Oligomer

A polycarbonate oligomer solution was obtained in the same manner as in the item (2) of Example IV-1 by using the bisphenol A produced in the item (1) of Comparative Example IV-1.

(3) Production of Polycarbonate

Polycarbonate flakes having a viscosity average molecular weight of 14,300 were obtained in the same manner as in the item (3) of Example IV-1 by using the polycarbonate oligomer solution produced in the item (2) of Comparative Example IV-1

(4) Production of Pellets

To the polycarbonate in a flake form obtained in the item (3), 300 ppm of glycerin monostearate as a releasing agent and 40 ppm of tris(2,4-di-t-butylphenyl)phosphite as a phosphorous antioxidant were added, and then pelletized with an extruder. The pellets had a viscosity average molecular weight of 14,100, an iron content of 0.3 ppm, a fraction of hydroxyl end groups of 7.5% by mole and a releasing agent amount of 250 ppm.

(5) Molding and Examination 600 pieces of disk substrates having a diameter of 130 mm and a thickness of 1.2 mm were produced by using the pellets obtained in the item (4) in the same manner as in the item (5) of Example IV-1.

The resulting disk substrates were examined with a flaw defect inspection machine, and as a result, the defects due to flash were 16%.

Comparative Example IV-2

(1) Production of Bisphenol A

Bisphenol A was produced in the same manner as in the item (1) of Example IV-1.

(2) Preparation of Polycarbonate Oligomer

A polycarbonate oligomer solution was obtained in the same manner as in the item (2) of Example IV-1.

(3) Production of Polycarbonate

Polycarbonate flakes were obtained in the same manner as in the item (3) of Example IV-1.

(4) Production of Pellets

To the polycarbonate in a flake form obtained in the item (3), 600 ppm of glycerin monostearate as a releasing agent and 40 ppm of tris(2,4-di-t-butylphenyl)phosphite as a phosphorous antioxidant were added, and then pelletized with an extruder. The pellets had a viscosity average molecular weight of 14,200, an iron content of 0.1 ppm, a fraction of hydroxyl end groups of 5.4% by mole and a releasing agent amount of 530 ppm.

(5) Molding and Examination 600 pieces of disk substrates having a diameter of 130 mm and a thickness of 1.2 mm were produced by using the pellets obtained in the item (4) in the same manner as in the item (5) of Example IV-1.

The resulting disk substrates were examined with a flaw defect inspection machine, and as a result, the defects due to flash were 4%. After the disk substrates were subjected to accelerated deterioration under constant temperature and humidity of 90° C. and 90% for 300 hours, the block error rate was 28 when they were measured with an electric characteristics inspection machine.

Comparative Example IV-3

(1) Production of Bisphenol A

Bisphenol A was produced in the same manner as in the item (1) of Example IV-1.

(2) Preparation of Polycarbonate Oligomer

A polycarbonate oligomer solution was obtained in the same manner as in the item (2) of Example IV-1.

(3) Production of Polycarbonate

Polycarbonate flakes were obtained in the same manner as in the item (3) of Example IV-1.

(4) Production of Pellets

To the polycarbonate in a flake form obtained in the item (3), 30 ppm of glycerin monostearate as a releasing agent and 40 ppm of tris(2,4-di-t-butylphenyl)phosphite as a phosphorous antioxidant were added, and then pelletized with an extruder. The pellets had a viscosity average molecular weight of 14,200, an iron content of 0.1 ppm, a fraction of hydroxyl end groups of 5.4% by mole and a releasing agent amount of 20 ppm.

(5) Molding and Examination 600 pieces of disk substrates having a diameter of 130 mm and a thickness of 1.2 mm were produced by using the pellets obtained in the item (4) in the same manner as in the item (5) of Example IV-1.

The resulting disk substrates were examined with a flaw defect inspection machine, and as a result, the defects due to flash were 17%.

Utility Field in Industry

According to the invention, a polycarbonate resin that is suitable for a material of an optical disk substrate having less defects due to flash without increase of an addition amount of a releasing agent to an unnecessary level, and an optical disk substrate formed with the resin can be provided.

What is claimed is:

1. A polycarbonate resin composition comprising:

a polycarbonate resin; and 100 to 500 ppm of a releasing agent, wherein said polycarbonate resin composition satisfies the following conditions:

(1) a viscosity average molecular weight is from 10,000 to 17,000, (2) an iron content is 0.2 ppm or less;

(3) when an intensity of a chemical shift δ of from 7.0 to 7.5 ppm based on a phenyl ring in a spectrum measured with $^1$H-NMR is 1,000, a plurality of signal intensities at δ of from 1.02 to 1.08 and from 6.69 to 6.73 are 0.01 or less;

wherein said polycarbonate resin is obtained from a dihydric phenol which has been purified by contacting with an ion exchange resin after distillation of unreacted acetone, by-produced water and alkylmercaptan as an auxiliary catalyst.

2. The polycarbonate resin composition as described in claim 1, which comprises from 150 to 350 ppm of a releasing agent.

3. The polycarbonate resin composition described in claim 1, wherein the releasing agent is a polyhydric alcohol fatty acid ester.

4. The polycarbonate resin composition described in claim 3, wherein the polyhydric alcohol fatty acid ester is a fatty acid monoester of glycerin.

5. An optical disk substrate comprising the polycarbonate resin composition described in claim 1.

6. The polycarbonate resin composition as described in claim 1, further comprising:

20 to 100 ppm of a phosphorous antioxidant.

7. The polycarbonate resin composition as described in claim 1, wherein said dihydric phenol used for obtaining the polycarbonate resin is bisphenol A.

8. The polycarbonate resin composition as described in claim 1, wherein said ion exchange resin is an acidic ion exchange resin.

9. The polycarbonate resin composition as described in claim 1, wherein said ion exchange resin is a sulfonic acid cation exchange resin.

10. The polycarbonate resin composition as described in claim 1, wherein said dihydric phenol used for obtaining the polycarbonate resin is bisphenol A; and wherein said ion exchange resin is a sulfonic acid cation exchange resin.

11. The optical disk substrate as described in claim 5, which comprises from 150 to 350 ppm of a releasing agent.

12. The optical disk substrate as described in claim 5, wherein the releasing agent is a polyhydric alcohol fatty acid ester.

13. The optical disk substrate as described in claim 12, wherein the polyhydric alcohol fatty acid ester is a fatty acid monoester of glycerin.

14. The optical disk substrate as described in claim 5, further comprising:

20 to 100 ppm of a phosphorous antioxidant.

15. The optical disk substrate as described in claim 5, wherein said dihydric phenol used for obtaining the polycarbonate resin is bisphenol A.

16. The optical disk substrate as described in claim 5, wherein said ion exchange resin is an acidic ion exchange resin.

17. The optical disk substrate as described in claim 5, wherein said ion exchange resin is a sulfonic acid cation exchange resin.

18. The optical disk substrate as described in claim 5, wherein said dihydric phenol used for obtaining the polycarbonate resin is bisphenol A; and wherein said ion exchange resin is a sulfonic acid cation exchange resin.

* * * * *